United States Patent [19]
Kendall

[11] Patent Number: 5,246,246
[45] Date of Patent: Sep. 21, 1993

[54] WALKING BEAM TRACK TENSION DEVICE

[75] Inventor: Donald H. Kendall, Lapeer County, Mich.

[73] Assignee: The United States of America as represented by the Secretary of the Army, Washington, D.C.

[21] Appl. No.: 944,603

[22] Filed: Sep. 14, 1992

[51] Int. Cl.[5] .................................................. B60G 5/02
[52] U.S. Cl. .................................... 280/677; 180/9.26; 305/32; 305/22
[58] Field of Search ............... 180/9.21, 9.26, 9.1, 180/9.52, 10; 280/28.5, 677; 305/7.29, 32, 21, 22

[56] References Cited

U.S. PATENT DOCUMENTS

| | | | |
|---|---|---|---|
| 2,315,421 | 3/1943 | Heaslet | 305/32 |
| 2,496,136 | 1/1950 | Smith | 305/21 |
| 2,998,998 | 9/1961 | Hyler et al. | 180/9.1 |
| 3,190,384 | 6/1965 | Dufresne | 305/22 |
| 3,447,621 | 6/1969 | Schoonover | 180/9.52 |
| 3,930,553 | 1/1976 | Kopera et al. | 180/9.52 |
| 5,076,378 | 12/1991 | Lagacé | 180/9.1 |
| 5,191,951 | 3/1993 | Bargfrede et al. | 280/28.5 |

*Primary Examiner*—Margaret A. Focarino
*Assistant Examiner*—Kevin Hurley
*Attorney, Agent, or Firm*—Peter A. Taucher; David L. Kuhn

[57] ABSTRACT

The invention is a walking beam for a tandem wheel set having a continuous track wrapped around tires on the set. The set's wheels are mounted on shoes which slide on bars forward or backward relative to the vehicle having the wheel set. A carriage member is linked to the shoes such that translation of the carriage member moves the shoes together or apart. Translation of the carriage member is effected by a rod rotatably mounted to the walking beam and threadingly engaged with the carriage member. Moving the shoes together reduces tension on the track whereas moving the shoes apart increases tension the track.

10 Claims, 3 Drawing Sheets

WALKING BEAM TRACK TENSION DEVICE

GOVERNMENT USE

The invention described herein may be manufactured, used and licensed by or for the U.S. Government for governmental purposes without payment to me of any royalty.

BACKGROUND

Military trucks and trailers typically travel over both roads and terrain, and these vehicles have wheel mounting suspension systems designed to operate on various ground surfaces. One such suspension system component is a walking beam rotatably mounted at its center on either end of a vehicle axle, the walking beam having a forward arm, a rearward arm telescoped thereon and one or more wheels mounted on each arm. Each arm commonly has a pair of wheels coaxially mounted thereto, with one wheel on the inboard side of the arm and the other wheel on the outboard side of the arm. Conventionally a track wraps about the fore and aft wheels on the walking beam to enhance the vehicle's ability to traverse rough terrain. These tracks need to be properly tensioned to enable the vehicle to travel over a paved road at normal roadway speeds and the relative telescoped position of the rearward arm can be changed to adjust tension on the track. However, known tension adjusting mechanisms, as shown in FIG. 8, are typically difficult to use, especially when the track is wrapped around the vehicle's wheels.

SUMMARY OF THE INVENTION

I address the above problem by providing a walking beam having an easily accessible track tensioning mechanism that is easy and quick to use. My walking beam has an axle engagement collar fixed between forward and rearward arms upon which ride shoes where wheels are mounted. The shoes are linked to a carriage member that translates on guides fixed relative to the collar, and carriage member translation adjusts the distance between the fore and aft wheels. The carriage member threads with a rotatable rod axially fixed relative to the collar and rotating the rod effects effects translation the carriage member.

BRIEF DESCRIPTION OF THE DRAWINGS

FIG. 8 is a prior art walking beam assembly.

PRIOR ART

Figure 1:
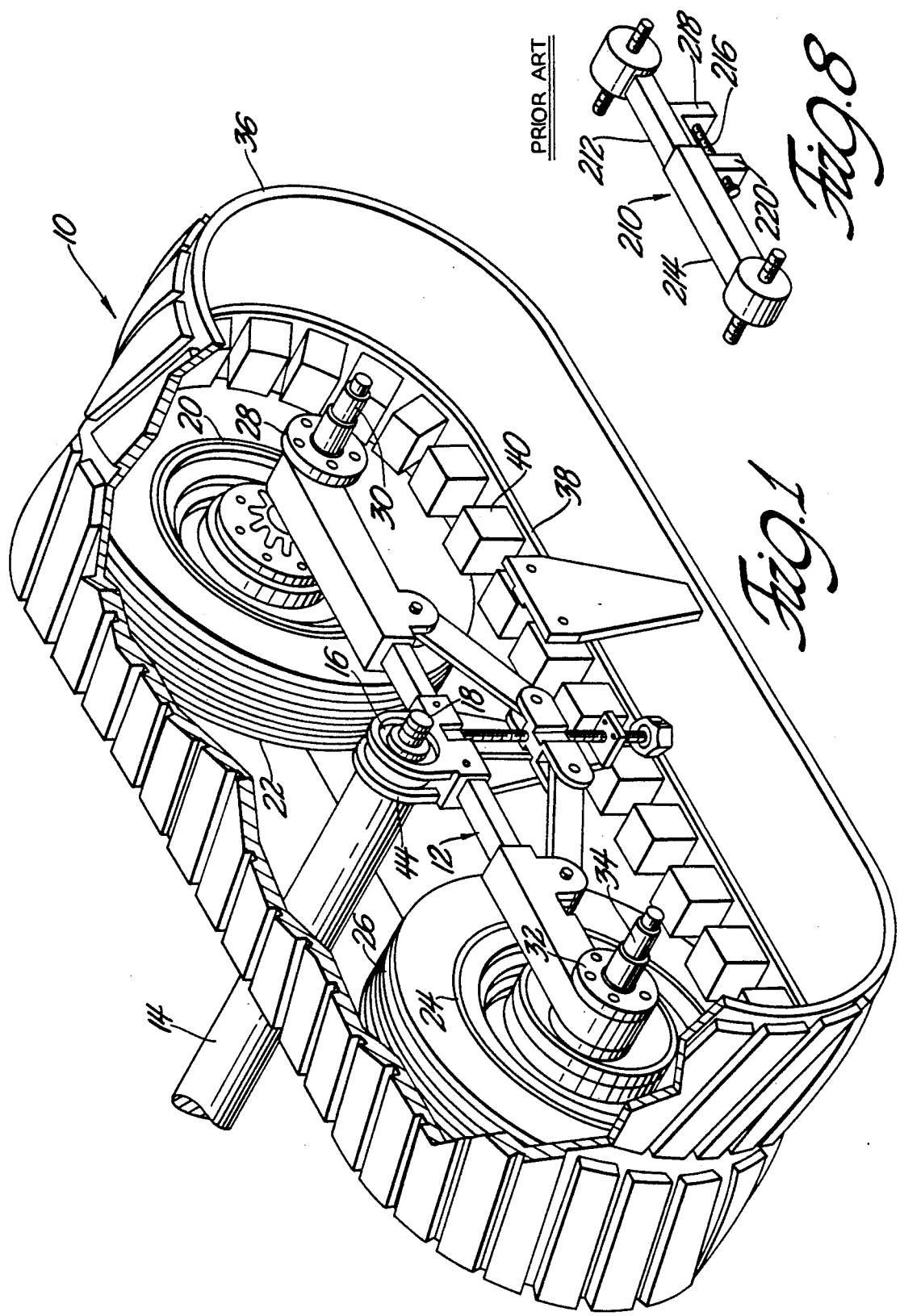
FIG. 1 is a perspective view showing my walking beam incorporated in a tandem wheel set with a continuous track or tread wrapped around tires of the set, two wheels of the set being removed to permit a better view of the walking beam.

FIG. 8 shows a prior art walking beam assembly 210 having telescoping arms 212 and 214. Internally threaded blocks 218 and 220 fixed to respective arms are engaged by an adjustment screw 216. Turning screw 216 axially extends or retracts arm 212 with respect to arm 214 to lengthen or shorten the walking beam assembly.

DETAILED DESCRIPTION

FIG. 1 shows my walking beam 12 as part of a tracked tandem wheel system 10, where the beam is pivotally connected in known fashion to vehicle axle 14 by nut 16 on the axle's threaded stub shaft 18. At one end of walking beam 12 is rotatably mounted wheel 20 having tire 22 mounted thereon and at the other end of the beam is rotatably mounted wheel 24 having tire 26 thereon. When system 10 is fully assembled, a third rotatable wheel having a third tire (neither shown) will be mounted to hub 28 and will be concentrically engaged with spindle 30. Similarly, a fourth rotatable wheel having a fourth tire (neither shown) will be mounted to hub 32 and will be concentrically engaged with spindle 34.

System 10 includes a continuous, one-piece band of flexible track or tread 36, which tightly wraps around the tires so that the tires and wheels rotate in concert the rolling of the track. On the inner peripheral surface of track 36 is a crenellated center guide 38 having block-like guide elements 40 aligned along a fore-to-aft axis of the track. As the track rolls, guide elements 40 pass between a first pair of tires—tire 22 and the third tire, and will also pass between a second pair of tires—tire 26 and the fourth tire. The paired tires trap center guide 38 therebetween so as to retain track 36 on wheel system 10.

Figure 2:
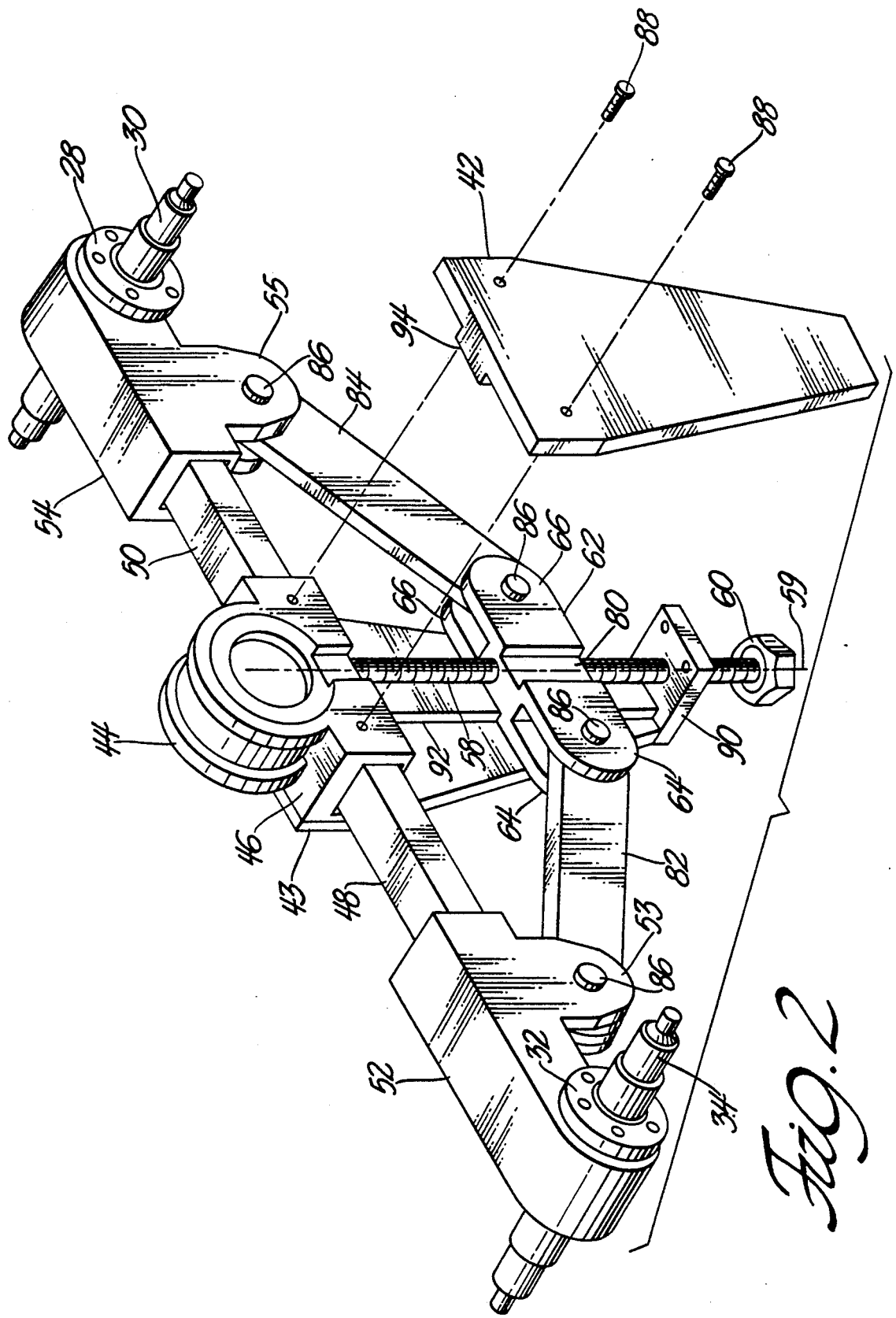
FIG. 2 is a perspective view of my walking beam with one of the retainer plates removed to show the walking beam's carriage member and nearby structure.
Figure 3:
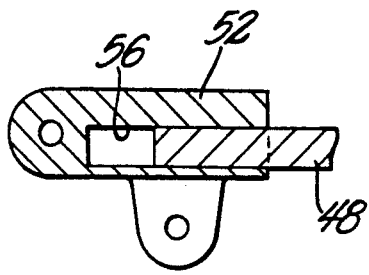
FIG. 3 is a partial sectional view showing a shoe on the end of a rectangular bar of the walking beam.
Figure 5:
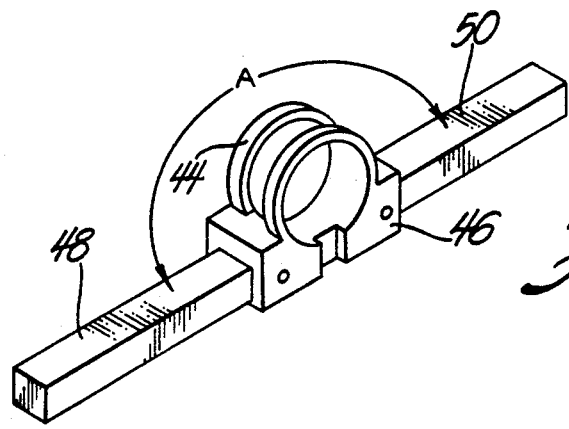
FIG. 5 is a perspective view of a subassembly of the walking beam comprised of a collar, a mid block integral with the collar and the rectangular bars.

FIG. 2 is an enlarged view of walking beam 12 wherein retainer plate 42 is removed from the walking beam so as to more clearly illustrate the inner components of the beam. Beam 12 has ribbed collar 44 fixed atop a mid block 46 from which extend cross-sectionally rectangular elongate bars 48 and 50. The bars are either in axial alignment or form therebetween an upper obtuse angle "A" (FIG. 5) of, say, 170 to 178 degrees. Closely and slidably fitting on the ends of bars 48 and 50 are shoes 52 and 54, both shoes defining a blind cavity such as cavity 56 (FIG. 3) to receive the end of a respective elongate bar. Shoe 52 defines a one pair of tabs 53 and shoe 54 defines another pair of tabs 55, each pair of tabs defining a flat, narrow gap therebetween.

Extending downward from mid block 46 in a general plane with bars 48 and 50 is threaded rod 58, which rotates on rod axis 59 relative to block 46 but does not translate relative to the block. Fixed to the end of rod 58 opposite from block 46 is flat hexagonal head 60, and between the block and head at least part of the rod is threaded. The threaded part of rod 58 passes through and engages threaded aperture 61 (FIG. 6) of carriage member 62 such that rotation of rod 58 relative to carriage member 62 translates the carriage member along the rod.

Figure 6:
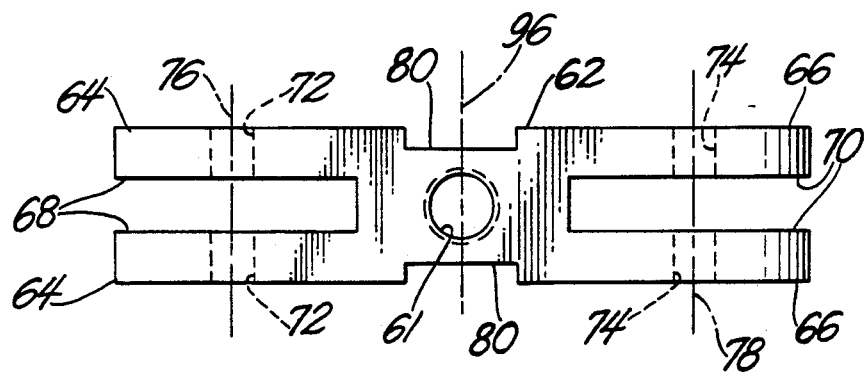
FIG. 6 is a plan view of the carriage member.

Referring now to FIGS. 2 and 6, one end of carriage member 62 defines one pair of opposed bracket walls 64 and the other end of carriage member 62 defines another pair of opposed bracket walls 66. Mutually facing inner surfaces 68 of walls 64 and analogous inner wall surfaces 70 of walls 66 are parallel to one another and define flat, narrow gaps. Each wall 64 defines an aperture 72 centered on axis 76 and each wall 66 defines an aperture 74 centered on axis 78. Running from top to bottom of carriage member 62 and disposed along aperture 61 on opposite sides of the carriage member 62 are cross-sectionally flat rectangular keyways 80.

Figure 4:
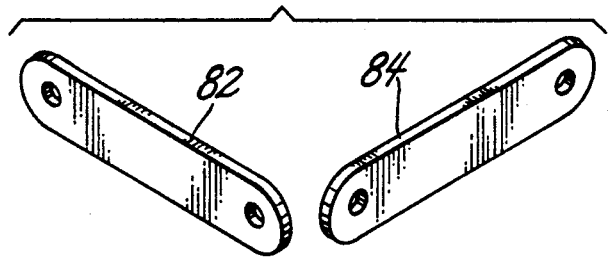
FIG. 4 is a perspective view of links of the walking beam.

As seen in FIGS. 2 and 4, elongate link 82 connects tabs 53 to bracket walls 64, one end of link 82 fitting bearingly but movably between tabs 53 and the opposite end of link 82 fitting bearingly but movably between bracket walls 64. Likewise, elongate link 84 connects tabs 54 to bracket walls 66, one end of link 84 fitting bearingly but movably between tabs 55 and the opposite end of link 84 fitting bearingly but movably between bracket walls 66. Ends 82 and 84 are pivotally attached to the respective pairs of tabs or bracket walls by pivot pins 86 extending through the pairs of the respective bracket walls or tabs.

Figure 7:
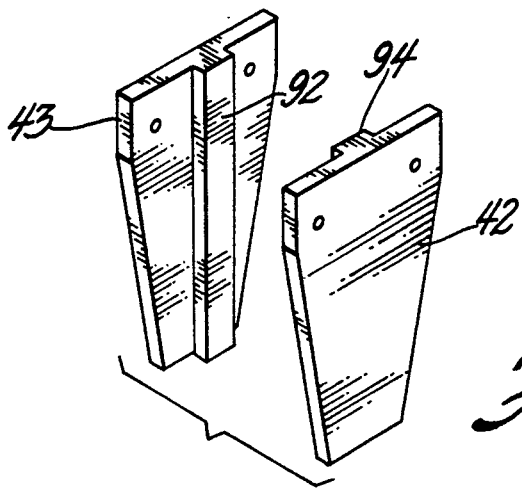
FIG. 7 is a perspective view of the retainer plates.

Referring to FIGS. 2 and 7, retainer plates 42 and 43 are fixed to either side of mid block 40 by bolts 88, by welding or by any other suitable means. Fixed between plates 42 and 43 at their lower ends is a lower terminus plate 90, the fixing means again being bolts, welding or any other suitable mechanism. Mid block 46, lower terminus plate 90 and retainer plates 42 and 43 together form a strong, rigid open-box frame surrounding and retaining carriage block 62.

Rod 58 passes through plate 90 but is not threaded therewith, so that rod 58 rotates freely while remaining translationally fixed relative to plate 90. On opposed inner surfaces of the retainer plates are flat, rib-like guides 92 and 94 oriented parallel to rod axis 59. Keyways 80 of carriage member 62 fit closely and slidably on guides 92 and 94 (FIG. 7) so that the carriage member translates up and down along the guides when rod 58 turns.

One may create a torque on carriage member 62 in the general plane defined by links 82 and 84 and elongate bars 48 and 50. The torque would be created by force components acting along links 82 and 84 when tandem wheel system 10 engages the ground. The torque will tend to tilt the carriage member about lateral axis 96 (FIG. 6) passing through the volumetric center of the carriage member normal to axis 59. Because of the torque, carriage member 62 will bind or rod 58 or on guides 92 and 94 when system 10 engages the ground. The torque thus prevents translation of the carriage member on rod 58 during operation of system 10. The torque can be created by locating one axis pin 86 on carriage member 62 assymetrically with respect to the other axis pin 86 on the carriage member. That is, one axis pin either is further from axis 59 or opposes a different point on axis 59 than the other axis pin. Another way to create the aforementioned torque is to dispose links 82 and 84 at unequal angles with respect to axis 59.

One may in some applications prefer that rod 58 be threaded with plate 90 and that rod 58 be axially fixed but rotatable with respect to carriage member 62. In such applications, the portion of rod 58 between collar 44 and carriage member 62 would either be truncated or eliminated altogether, whereby rod will not limit upward translation of carriage member 62 in FIG. 2. In this arrangement, head 60 moves away from track 36 when the shoes slide away from collar 44 during tightening of track 36 onto wheel system 10. Head 60 in this arrangement thus has less tendency to interfere with the track during over-terrain travel thereof.

Referring to FIG. 1 and 2, removal of track 36 from tandem wheel system 10 is accomplished by first turning rod 58 so that carriage member 62 translates downward. Shoes 52 and 54 slide toward one another by virtue of their linked connection to the carriage member, whereby one set of coaxial tires is drawn toward the other set of coaxial tires. Track 36 is now loose on the tires and can be removed from system 10. Installing a new track can be done by the reverse process.

I wish it to be understood that I do not desire to be limited to the exact details of construction shown and described herein since obvious modifications will occur to those skilled in the relevant arts without departing from the spirit and scope of the following claims.

I claim:

1. A walking beam for a tandem wheel system allowing removal of a continuous track wrapped around two or more sets of wheels, comprising:

a collar rotatable upon the end of a vehicle axle;

a mid block fixed to the collar;

two elongate cross-sectionally rectangular bars fixed to the mid block, the bars extending in opposite directions generally perpendicular to the axle;

shoes slidable on the bars, the shoes defining rectangular openings closely receiving ends of the bars;

means for mounting the sets of vehicle wheels on the shoes;

a rod rotatably connected to the mid block, the rod being translationally fixed relative to the mid block;

a pair of retainer plates fixedly connected to the mid block, the retainer plates each having an inner surface faced toward the rod:

a terminus plate fixed to ends of the retainer plates more remote from the collar, whereby the mid block, retainer plates and terminus plate form a rigid open-box frame, the terminus plate defining an aperture through which the rod extends and with respect to which the rod freely rotates, the rod axially fixed relative to the terminus plate;

guides fixed inside the frame and disposed along the rod;

a carriage member slidable along the guides and threadingly engaged to the rod, the carriage member defining keyways closely fit on the guides;

two pairs of parallel bracket walls connected to the carriage member, the bracket wall of each pair having opposed inner wall surfaces defining therebetween a flat, smooth, narrow bracket gap;

a pair of tabs connected to each shoe, the pairs of tabs defining flat smooth tab gaps therebetween;

a first link connected between the carriage member and one of the shoes, the first link having first flat ends closely but movably sandwiched respectively by the pair of tabs on the one shoe and one pair of bracket walls on the carriage member;

a second link connected between the carriage member and another of the shoes, the link having second flat ends closely but movably sandwiched respectively by the pair of tabs on the other shoe and another pair of bracket walls on the carriage member.

2. The walking beam of claim 1 wherein the carriage member is subjected to a torque tending to tilt the carriage member about an axis normal to the rod whereby the carriage member binds with another element of the walking beam.

3. The walking beam of claim 1 wherein the bars each defines an angle of greater than 90 degrees with the rod.

4. A walking beam for a tandem wheel system, comprising:
   a collar rotatable upon the end of a vehicle axle;
   two bars fixed relative to the collar;
   shoes connected to the bars, at least one shoe slidable on one of the bars;
   means for mounting vehicle wheels on the shoes;
   a guide connected to the walking beam fixed relative to the collar;
   a carriage member connected to the guide;
   means to translate the carriage member along the guide;
   a link pivotally connected with the carriage member and the one shoe.

5. The walking beam of claim 4 wherein the carriage member is subjected to a torque tending to tilt the carriage member in the general plane defined by the carriage member the link and the bars, whereby the carriage member is inhibited from translating along the rod.

6. The walking beam of claim 4 wherein the bars each defines an angle of greater than 90 degrees with the rod.

7. A walking beam for a tandem wheel system, comprising:
   a collar rotatably connected to the end of a vehicle axle, the collar having a block portion integral therewith;
   two bars fixed to the collar and extended in opposite directions from the collar;
   shoes slidable on the bars;
   a rod rotatably connected to the collar and translationally fixed relative to the collar;
   a pair of retainer plates fixedly connected along the rod to the collar;
   a guide connected to one of the retainer plates, the guide disposed along the rod;
   a carriage member slidable along the guide and threadingly engaged to the rod, whereby rotating the rod slides the carriage member along the guides;
   a first link pivotally connected with the carriage member and one of the shoes;
   a second link member connected with the carriage member and another of the shoes;
   the shoes translatable an the bars in concert with translation of the carriage member along the guides.

8. The walking beam of claim 7 wherein the links tilt the carriage member relative to the carriages pathway along the guide and the rod, whereby the carriage member tends to bind with one or more other walking beam elements.

9. The walking beam of claim 8 wherein the other walking beam elements include the rod and the guide.

10. The walking beam of claim 9 further comprising:
   two pairs of bracket walls connected to the carriage members, the pairs of bracket walls each defining a flat, smooth bracket gap;
   a pair of tabs connected to each of the shoes, the pairs of tabs defining flat, smooth tab gaps;
   flat, smooth ends on either end of both links, wherein respective flat, smooth ends of the links closely but movably fit in respective ones of the gaps;
   whereby the links tend to reinforce the bars.

* * * * *